United States Patent [19]
Lin

[11] Patent Number: 5,934,690
[45] Date of Patent: Aug. 10, 1999

[54] CHUCK UNIT OF A POWER HAND TOOL

[75] Inventor: Yuan-Ho Lin, Changhua Hsien, Taiwan

[73] Assignee: Chum Power Machinery Corp., Taichung Hsien, Taiwan

[21] Appl. No.: 09/145,655

[22] Filed: Sep. 2, 1998

[51] Int. Cl.[6] ..................................... B23B 5/22
[52] U.S. Cl. ................ 279/62; 279/61; 279/902
[58] Field of Search ............................. 279/61, 62, 902

[56] References Cited

U.S. PATENT DOCUMENTS

| | | | |
|---|---|---|---|
| 5,232,230 | 8/1993 | Lin | 279/62 |
| 5,407,215 | 4/1995 | Yang | 279/64 |
| 5,458,345 | 10/1995 | Amyot | 279/62 |
| 5,501,473 | 3/1996 | Barton et al. | 279/62 |
| 5,553,873 | 9/1996 | Salapaka et al. | 279/62 |
| 5,816,582 | 10/1998 | Steadings et al. | 279/62 |
| 5,829,762 | 11/1998 | Claramunt et al. | 279/62 |

*Primary Examiner*—William Briggs
*Assistant Examiner*—Rouzbeh Tabaddor
*Attorney, Agent, or Firm*—Bacon & Thomas, PLLC

[57] ABSTRACT

A chuck unit installed in a power hand tool and controlled to hold down/release a bit, including a barrel, three clamping rods, a front cover shell, a rotary control device, a stop member, a rear cover shell, and a dust ring, wherein the rotary control device has a nut with embossed peripheral blocks for positive positioning in respective recessed locating holes in the front cover shell; the rotary control device is coupled to a stop flange outside the barrel and revolvably supported on the barrel by steel balls; the stop member is formed of two symmetrical halves and mounted on the front end of the barrel to stop the rotary control device from forward movement.

3 Claims, 8 Drawing Sheets

CHUCK UNIT OF A POWER HAND TOOL

BACKGROUND OF THE INVENTION

The present invention relates to a chuck unit for a power hand tool, and more particularly to such a chuck unit which can be manually or automatically operated to hold down/release the inserted bit and, which keeps the bit to be rotated stably.

Figure 1:
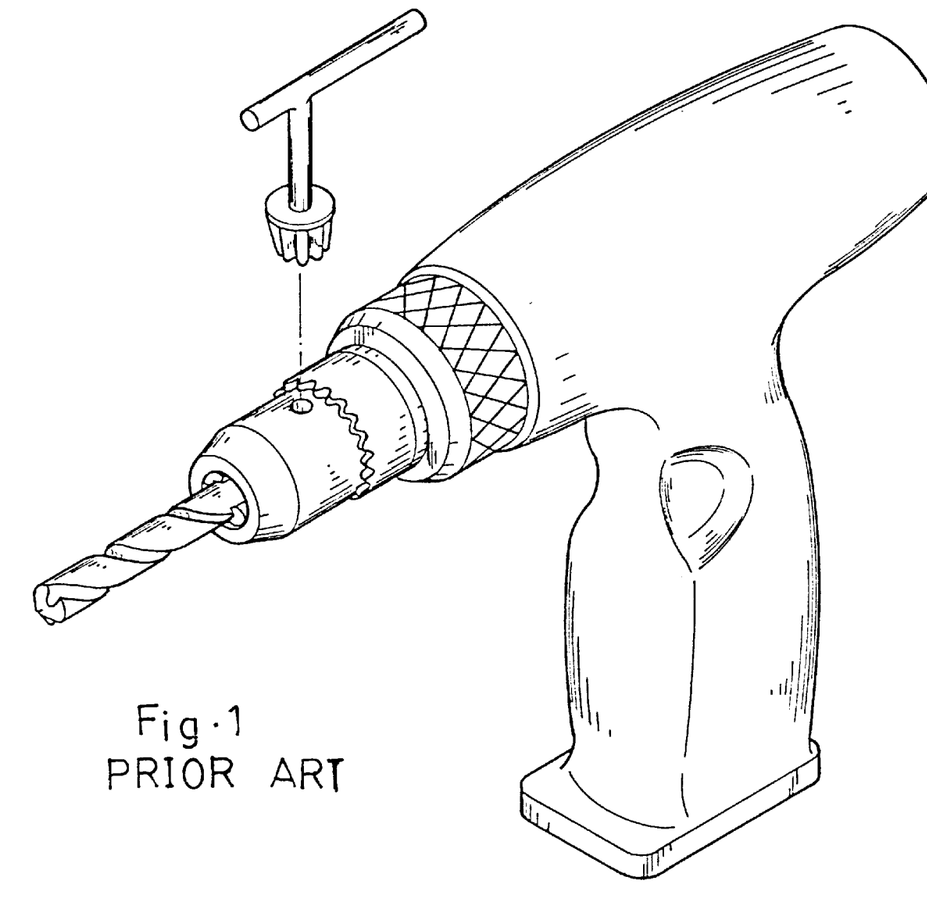
FIG. 1 is a schematic elevational view the arrangement of a power hand tool and a T-shaped spanner according to the prior art.
Figure 2:
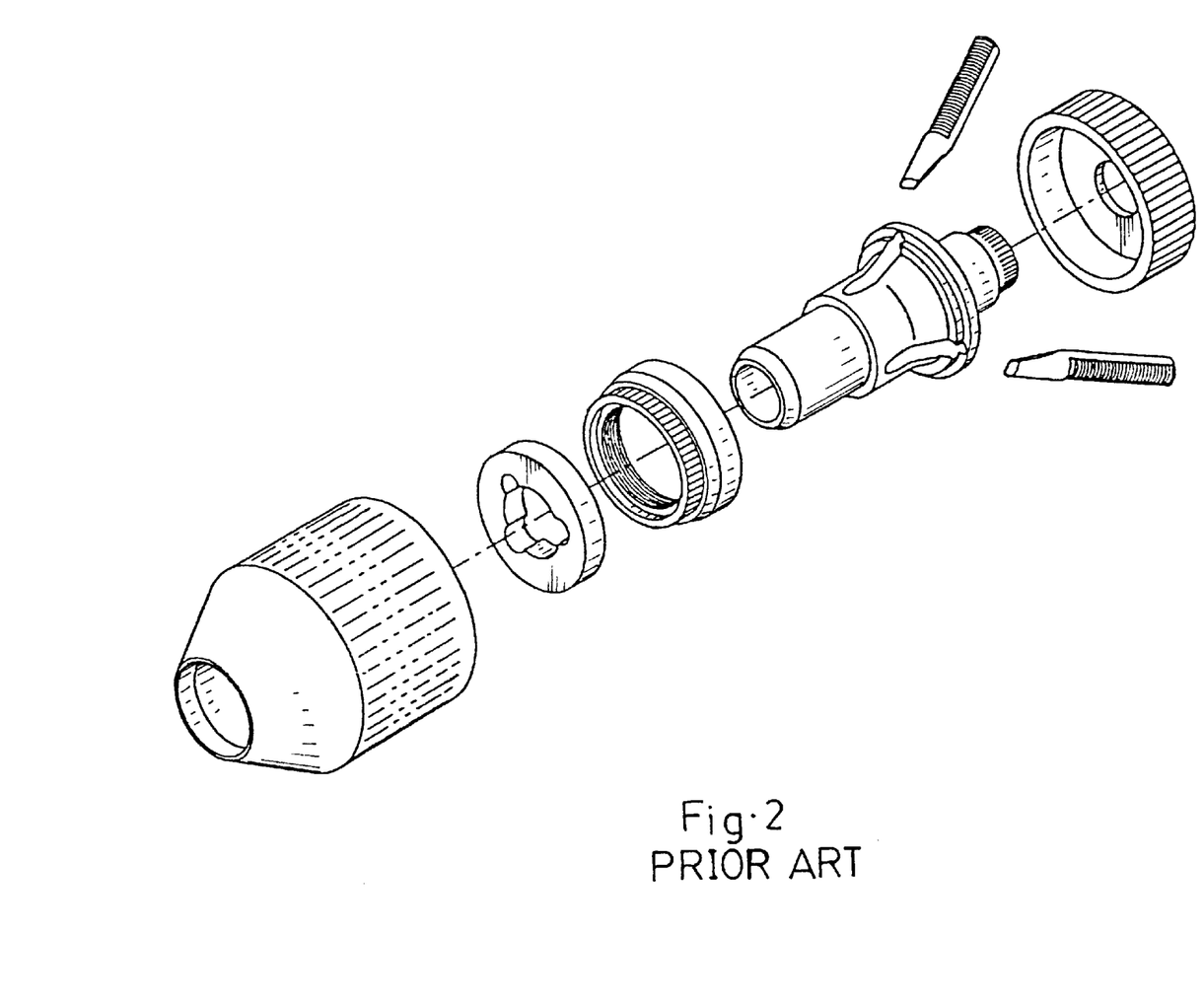
FIG. 2 is an exploded view of a chuck unit for a power hand tool according to the prior art.
Figure 3:
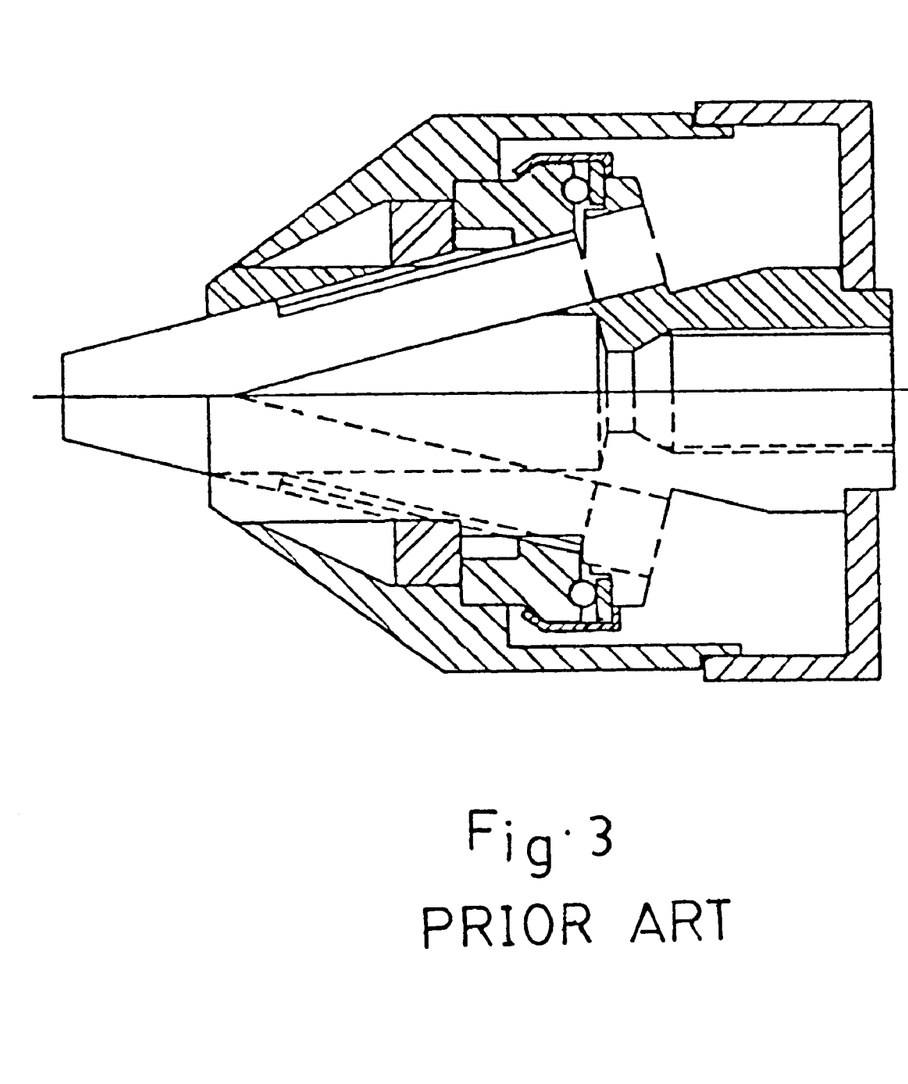
FIG. 3 is a sectional assembly view in an enlarged scale of the chuck unit shown in FIG. 2.

FIG. 1 shows a T-shaped spanner used with a conventional power hand drill. The bit chuck of this structure of power hand drill is driven to hold down/release the bit by hand with the T-shaped spanner. Because the bit chuck of this structure of power hand must be driven to hold down/release the bit by hand with the T-shaped spanner, the power hand tool becomes unable to be operated if the T-shaped spanner is missed. FIGS. 2 and 3 show another arrangement of chuck unit for a power hand tool according to the prior art. This structure of chuck unit comprises a barrel having three equiangularly spaced oblique guide holes, three threaded clamping rods respectively inserted into the oblique guide holes, a nut threaded onto the threaded clamping rods and rotated with a front cover shell to move the clamping rods between the clamping position and the relief position.

SUMMARY OF THE INVENTION

It is one object of the present invention to provide a chuck unit for a power hand tool which can be positively installed in a power hand tool. It is another object of the present invention to provide a chuck unit for a power hand tool which keeps the bit stably rotated without causing a vibration when the power hand tool is operated. It is still another object of the present invention to provide a chuck unit for a power hand tool which is durable in use. According to one aspect of the present invention, the chuck unit comprises a barrel, the barrel comprising an axial center through hole, a collar raised around the periphery on the middle and dividing the barrel into a front half and a rear half, a plurality of oblique guide holes equiangularly spaced around the periphery of the front half and respectively extended from a front side of the collar to the axial center through hole, a positioning groove provided at the front side of the collar, a stop flange at one side of the positioning groove, and a locating groove around the periphery of the front half; a plurality of clamping rods respectively inserted into the oblique guide holes and moved in and out of the axial center through hole, the clamping rods each having a toothed portion disposed outside the barrel and a sloping clamping face moved with the respective clamping rod in and out of the axial center through hole of the barrel to clamp/release the bit; a front cover shell having a stepped inside wall and a plurality of recessed locating hole equiangularly spaced in the stepped inside wall; a rotary control device mounted on the barrel inside the front cover shell, the rotary control device comprised of a nut, a back ring, a number of steel balls and a coupling device, the nut comprising a plurality of peripheral blocks for positioning in the recessed locating holes inside the front cover shell, a rear coupling flange raised from a rear side thereof, an annular track disposed around an inside wall thereof, which receives the steel balls, an inside annular flange raised from the inside wall along the annular track and coupled to the positioning groove at one side of the stop flange of the barrel, and a threaded taper hole meshed with the threaded portions of the clamping rods, the coupling device securing the nut and the back ring together and comprising a front coupling flange coupled to the rear coupling flange of the nut and a rear coupling flange coupled to the back ring; a stop member mounted around the front half of the barrel within the front cover shell and stopped against the nut, the stop member having a front mounting flange engaged into the locating groove around the periphery of the front half of the barrel; a rear cover shell mounted around the rear half of the barrel and fastened to the front cover shell, the rear cover shell having a center coupling hole engaged with the rear half of the barrel; and a dust ring mounted on one end of the front half of the barrel remote from the collar within the front cover shell. According to another aspect of the present invention, the stop member is peripherally embossed for positive positioning in the front cover shell.

DETAILED DESCRIPTION OF THE PREFERRED EMBODIMENT

Figure 4:
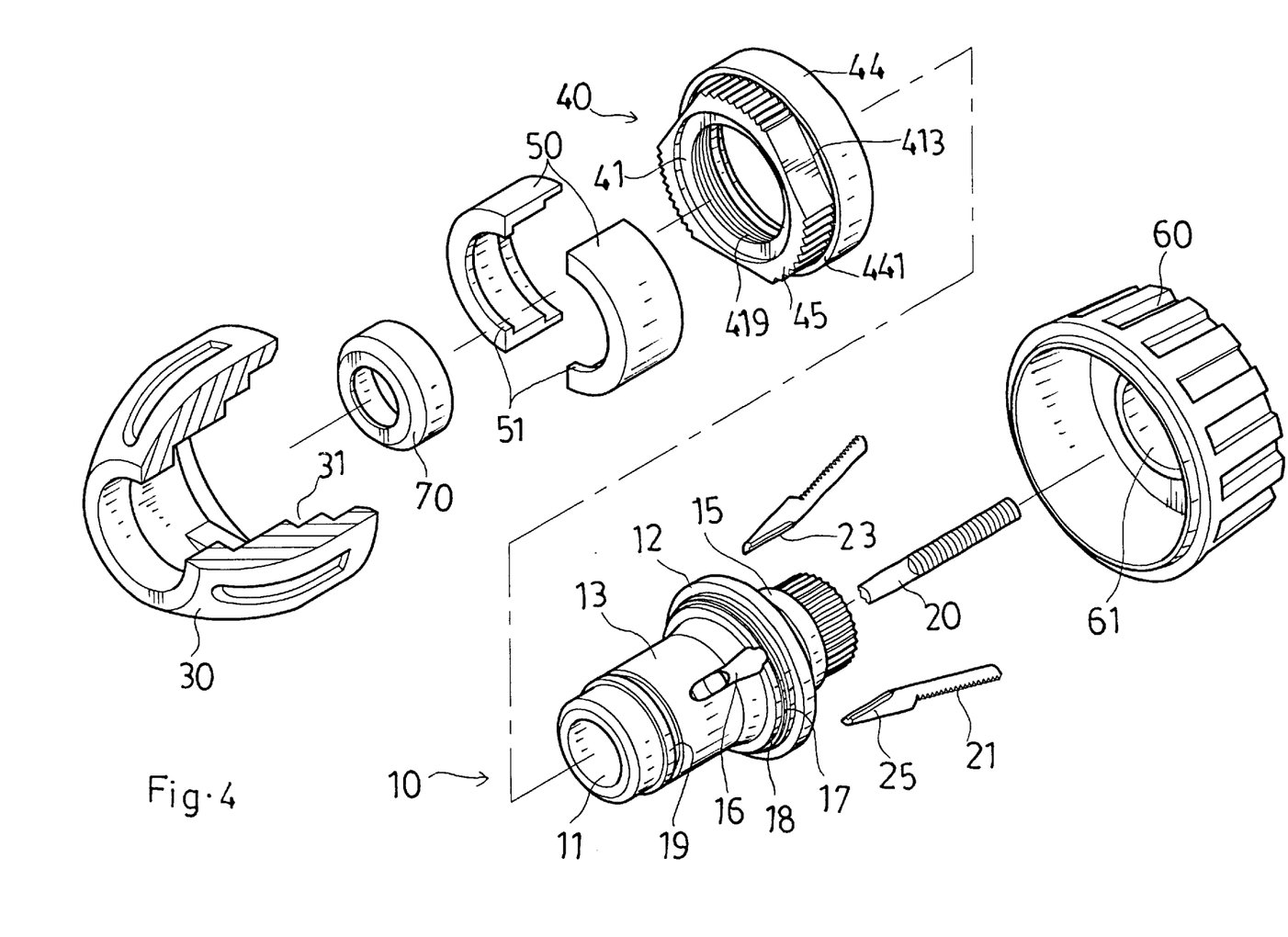
FIG. 4 is an exploded view of a chuck unit for a power hand tool according to the present invention.
Figure 5:
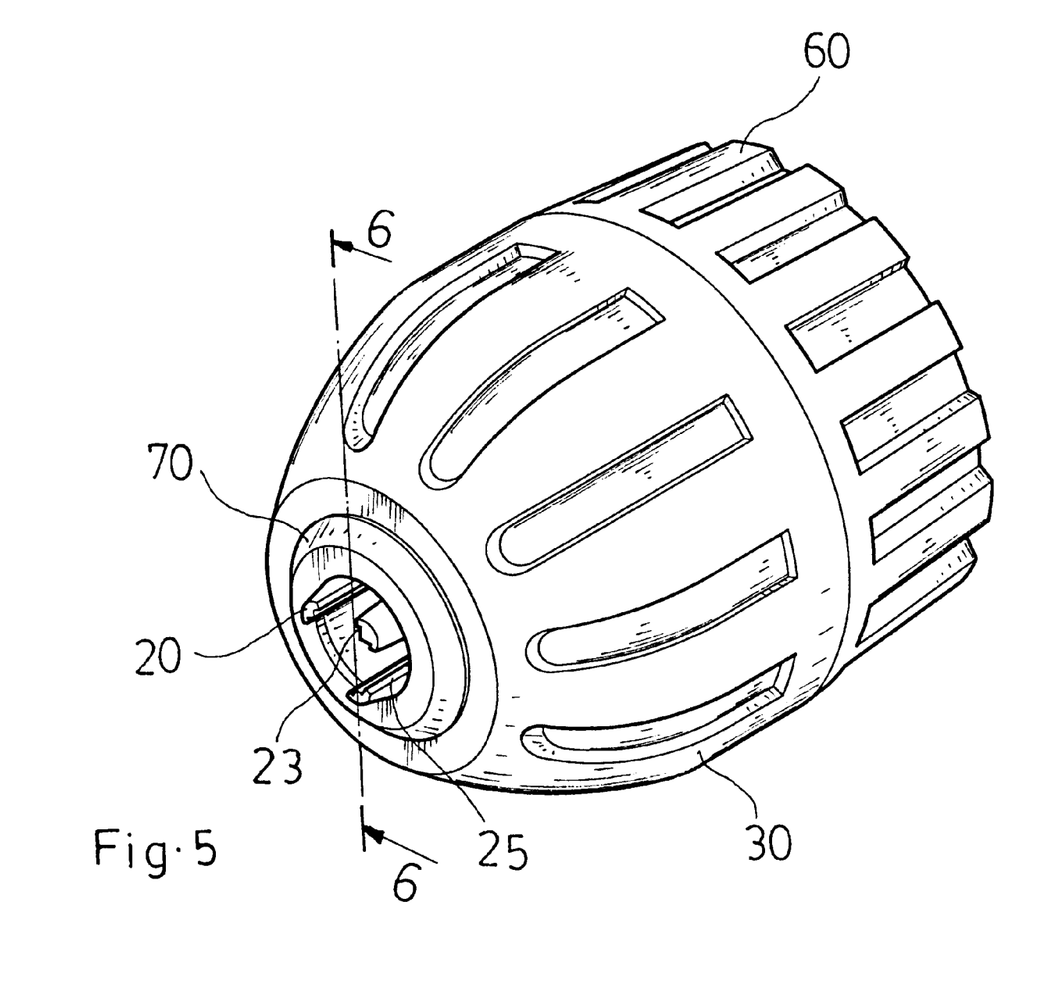
FIG. 5 is a perspective assembly view of the chuck unit shown in FIG. 4.
Figure 6:
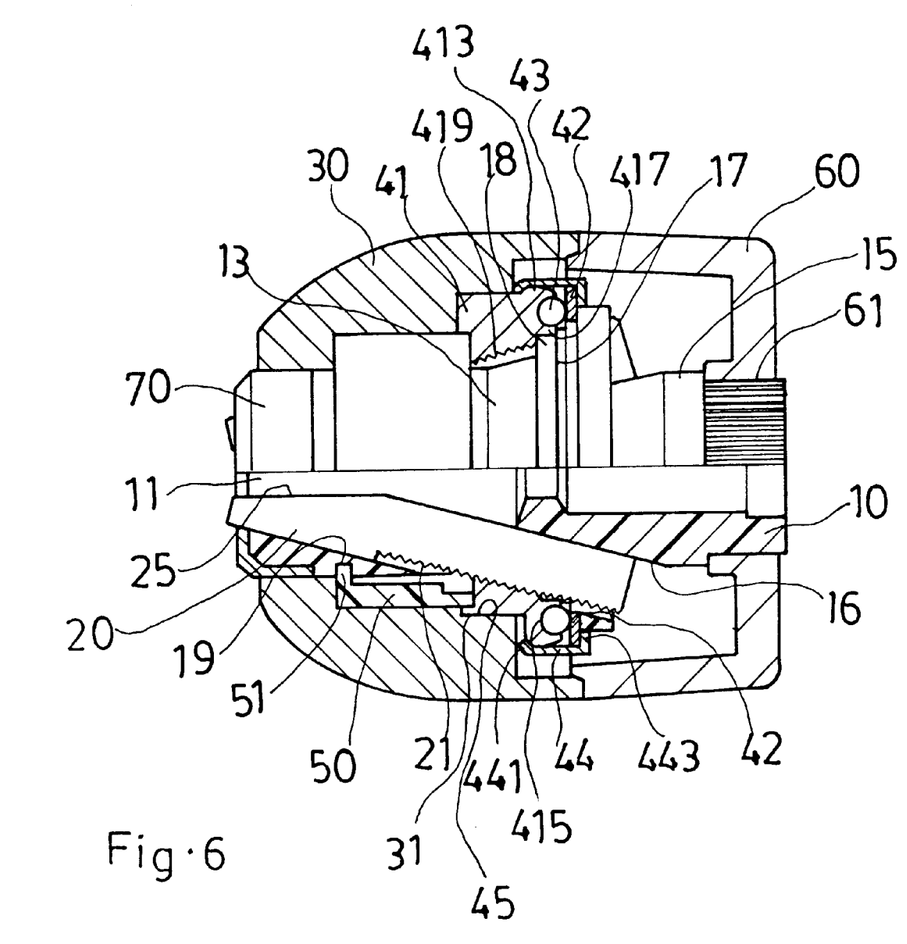
FIG. 6 is a sectional view taken along line 6-6 of FIG. 5.

Referring to Figures from 4 through 6, a chuck unit of a power hand tool in accordance with the present invention is generally comprised of a barrel 10, three clamping rods 20, a front cover shell 30, a rotary control device 40, a stop member 50, a rear cover shell 60, and a dust ring 70.

The barrel 10 comprises an axial center through hole 11, a collar 12 raised around the periphery on the middle and dividing the barrel 10 into a front half 13 and an embossed rear half 15, three oblique guide holes 16 equiangularly spaced around the periphery of the front half 13 and respectively extended from one side namely the front side of the collar 12 to the axial center through hole 11, a positioning groove 17 provided at the front side of the collar 12, a stop flange 18 at one side of the positioning groove 17, and a locating groove 19 around the periphery of the front half 13.

The clamping rods 20 are respectively inserted into the oblique guide holes 16 and moved in and out of the axial center through hole 11, each having a toothed portion 21 disposed outside the barrel 10 and a sloping clamping face 25 with two parallel grooves 23 disposed inside the barrel 10.

The front cover shell 30 is a hollow shell having three recessed locating holes 31 equiangularly spaced in the stepped inside wall thereof for the positioning of the rotary control device 40.

The rotary control device 40 is mounted on the barrel 10, and comprised of a nut 41, a back ring 42, a number of steel balls 43 and a coupling device 44. The nut 41 comprises three peripherally embossed blocks 45 equiangularly spaced around the periphery, a rear coupling flange 413 raised from the rear side thereof, an annular track 415 disposed around the inside wall thereof, which receives the steel balls 43, an inside annular flange 417 raised from the inside wall thereof along the annular track 415 and coupled to the positioning groove 17 at one side of the stop flange 18 of the barrel 10, and a threaded taper hole 419 meshed with the threaded portions 21 of the clamping rods 20. The coupling device 44 secures the nut 41 and the back ring 42 together, comprising a front coupling flange 441 coupled to the rear coupling flange 411 of the nut 41 and a rear coupling flange 443 coupled to the back ring 42.

The stop member 50 is an annular device formed of two symmetrical halves and mounted around the front half 13 of the barrel 10 within the front cover shell 30 and stopped against the nut 41, having a front mounting flange 51 engaged into the locating groove 19 around the periphery of the front half 13 of the barrel 10.

The rear cover shell 60 is mounted around the rear half 15 of the barrel 10 and fastened to the front cover shell 30 to hold the other component parts of the chuck unit on the inside, having a center coupling hole 61 engaged with the embossed rear half 15 of the barrel 10.

The dust ring 70 is mounted on the front end of the front half 13 of the barrel 10 within the front cover shell 30 to stop dust from passing to the inside of the chuck unit and to protect the front end of the barrel 10 against damage during the operation of the power hand tool.

The chuck unit can be manually or automatically operated to chuck/release the bit. If the manual operation mode is selected, the bit is inserted into the axial center through hole 11, then the rotary control device 40 is rotated to move the clamping rods 20 forwards into the axial center through hole 11, causing the clamping faces 25 of the clamping rods 20 to be clamped on the inserted bit. The inserted bit is released from the clamping rods 20 when the rotary control device 40 is rotated in the reversed direction. If the automatic operation mode is selected, the bit is inserted into the axial center through hole 11, then the front cover shell 30 is compressed with the hand, and then the power hand tool is started to turn its reversible motor forwards/backwards so as to move the clamping rods 20 forwards/backwards, causing the clamping rods 20 to clamp/release the bit.

Figure 7:
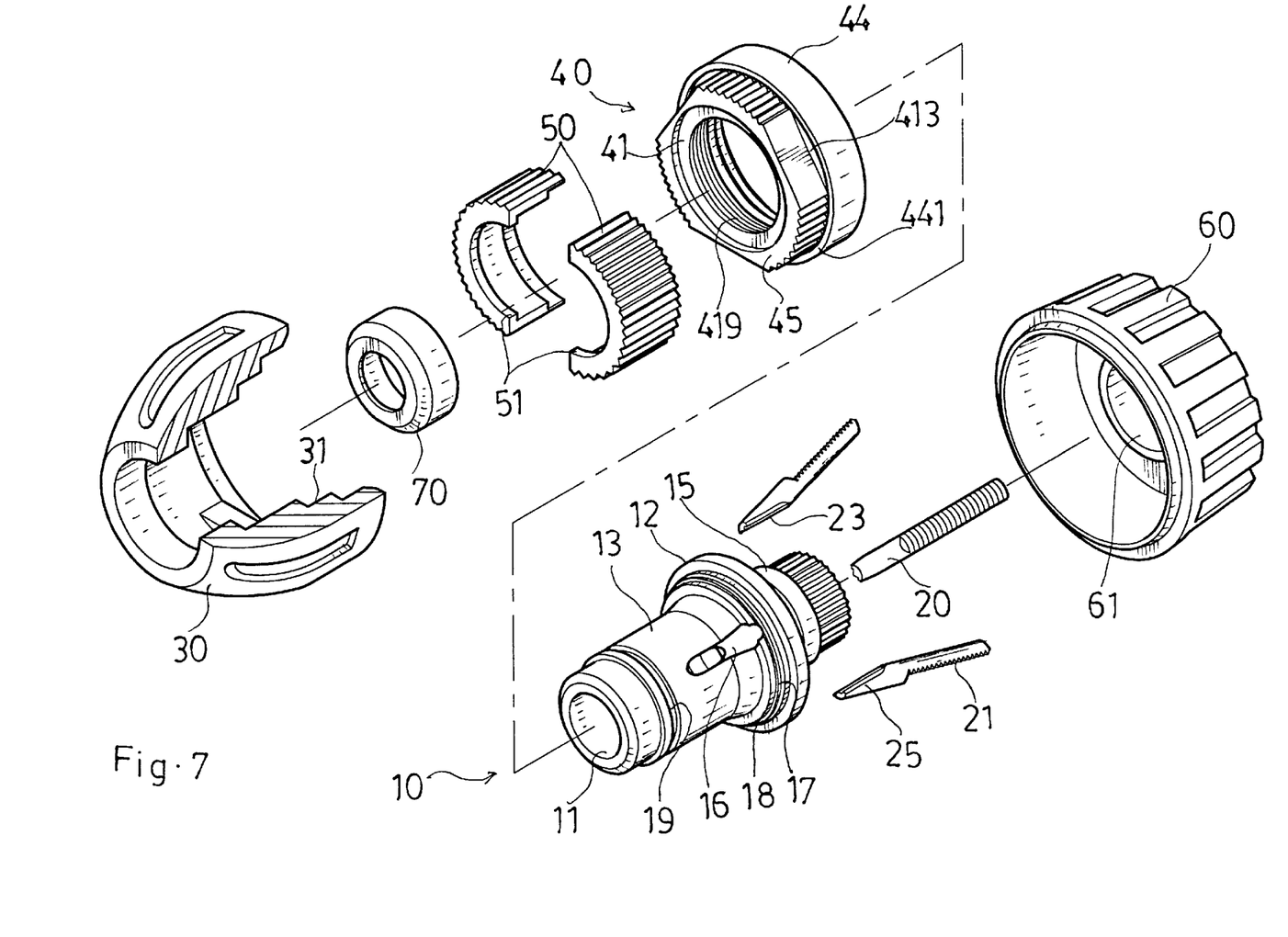
FIG. 7 is an exploded view of an alternate form of the present invention.

Referring to FIG. 7, the stop member 50 may be peripherally embossed for positive positioning in the front cover shell 30.

Figure 8:
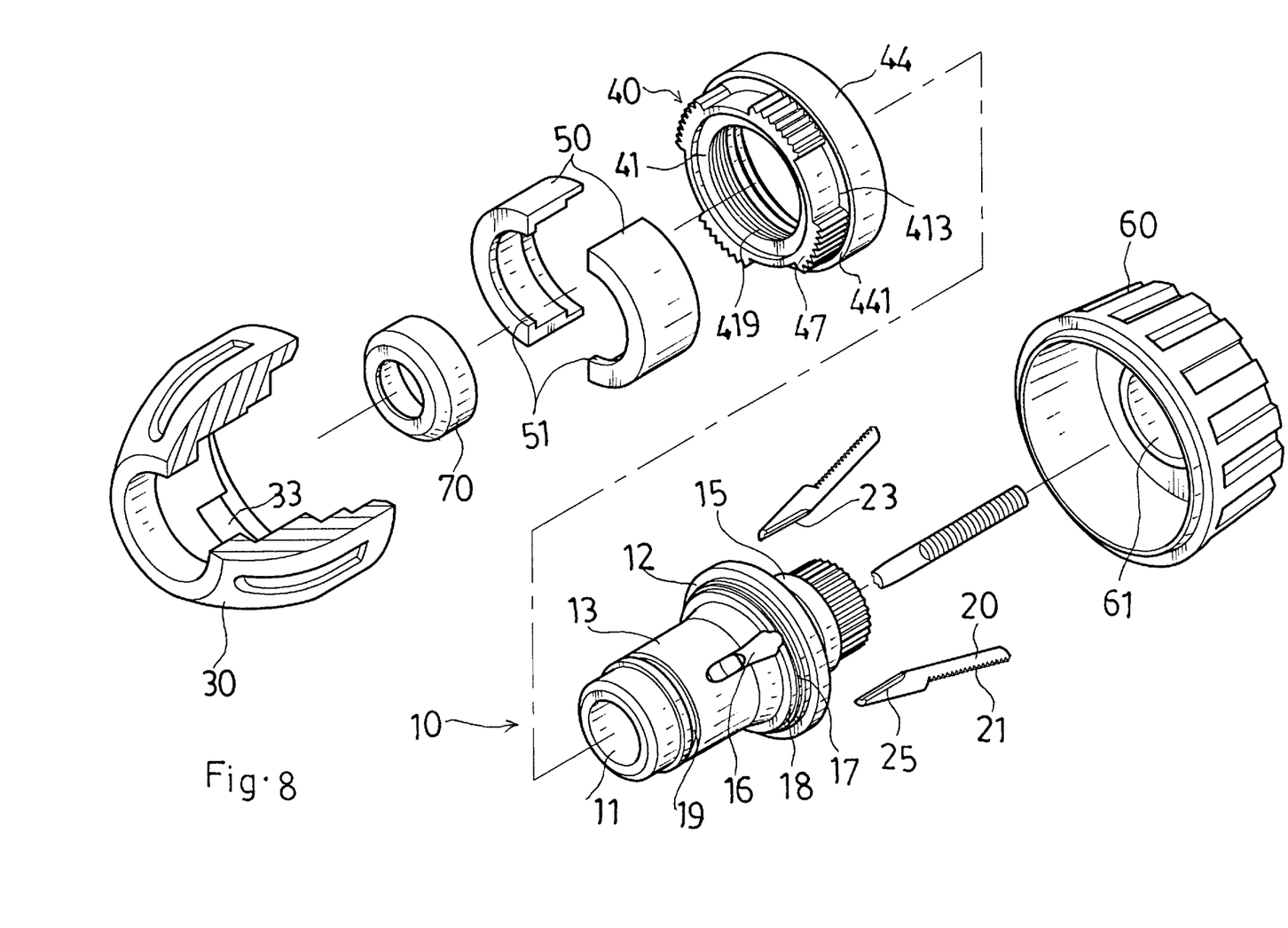
FIG. 8 is an exploded view of another alternate form of the present invention.

Referring to FIG. 8, the nut 41 can be made having a plurality of peripherally embossed blocks 47 raised around the periphery, and the front cover shell 30 is made having a recessed locating hole 33 fitting the shape of the embossed blocks 47.

What is caimed is:

1. A chuck unit installed in a power hand tool and controlled to hold down/release a bit, comprising:

a barrel, the barrel comprising an axial center through hole, a collar raised around the periphery on the middle and dividing the barrel into a front half and a rear half, a plurality of oblique guide holes equiangularly spaced around the periphery of the front half and respectively extended from a front side of the collar to the axial center through hole, a positioning groove provided at the front side of the collar, a stop flange at one side of the positioning groove, and a locating groove around the periphery of the front half;

a plurality of clamping rods respectively inserted into the oblique guide holes and moved in and out of the axial center through hole, the clamping rods each having a toothed portion disposed outside the barrel and a sloping clamping face moved with the respective clamping rod in and out of the axial center through hole of the barrel to clamp/release the bit;

a front cover shell having a stepped inside wall and a plurality of recessed locating hole equiangularly spaced in the stepped inside wall;

a rotary control device mounted on the barrel inside the front cover shell, the rotary control device comprised of a nut, a back ring, a number of steel balls and a coupling device, the nut comprising a plurality of peripheral blocks for positioning in the recessed locating holes inside the front cover shell, a rear coupling flange raised from a rear side thereof, an annular track disposed around an inside wall thereof, which receives the steel balls, an inside annular flange raised from the inside wall along the annular track and coupled to the positioning groove at one side of the stop flange of the barrel, and a toothed taper hole meshed with the threaded portions of the clamping rods, the coupling device securing the nut and the back ring together and comprising a front coupling flange coupled to the rear coupling flange of the nut and a rear coupling flange coupled to the back ring;

a stop member mounted around the front half of the barrel within the front cover shell and stopped against the nut, the stop member having a front mounting flange engaged into the locating groove around the periphery of the front half of the barrel;

a rear cover shell mounted around the rear half of the barrel and fastened to the front cover shell, the rear cover shell having a center coupling hole engaged with the rear half of the barrel; and a dust ring mounted on one end of the front half of the barrel remote from the collar within the front cover shell.

2. The chuck unit of claim 1 wherein said stop member is peripherally embossed.

3. The chuck unit of claim 1 wherein said plurality of periphal blocks comprise three peripheral blocks peripherally embossed and equiangularly spaced around the periphery of said nut, and said plurality of recessed locating holes comprises three recessed locating holes equiangularly spaced around the stepped inside wall thereof for receiving the peripheral blocks of the nut respectively.

* * * * *